United States Patent
Dario et al.

(10) Patent No.: US 6,840,257 B2
(45) Date of Patent: Jan. 11, 2005

(54) PROPORTIONAL VALVE WITH SHAPE MEMORY ALLOY ACTUATOR

(75) Inventors: Paolo Dario, Livorno (IT); Maria Chiara Carrozza, Pisa (IT); Alberto Arena, Contrada Conca d'Oro - Garden Ville n.24, 98168 Messina (IT)

(73) Assignee: Alberto Arena, Messina (IT)

( * ) Notice: Subject to any disclaimer, the term of this patent is extended or adjusted under 35 U.S.C. 154(b) by 0 days.

(21) Appl. No.: 10/477,625
(22) PCT Filed: May 8, 2001
(86) PCT No.: PCT/IT01/00219
§ 371 (c)(1),
(2), (4) Date: Nov. 10, 2003
(87) PCT Pub. No.: WO02/090807
PCT Pub. Date: Nov. 14, 2002

(65) Prior Publication Data
US 2004/0129315 A1 Jul. 8, 2004

(51) Int. Cl.[7] .............................................. F16K 31/02
(52) U.S. Cl. ......................... 137/9; 137/14; 137/487.5; 251/11; 251/129.01
(58) Field of Search .......................... 137/9, 14, 487.5; 251/11, 129.01, 129.06; 60/528

(56) References Cited

U.S. PATENT DOCUMENTS

| | | | | |
|---|---|---|---|---|
| 5,211,371 A | * | 5/1993 | Coffee ........................... | 251/11 |
| 6,247,493 B1 | * | 6/2001 | Henderson ................ | 137/487.5 |
| 6,691,977 B2 | * | 2/2004 | Knebel et al. ................ | 251/11 |

* cited by examiner

Primary Examiner—Ramesh Krishnamurthy
(74) Attorney, Agent, or Firm—Steinberg & Raskin, P.C.; Grant E. Pollack

(57) ABSTRACT

A proportional valve is disclosed for controlling the outlet pressure of a fluid flowing therethrough. The valve comprises a valve body having an inlet port and an outlet port for the fluid. The valve also has an inner chamber, within which there is formed a valve seat that may be opened and closed variably by a shutter axially movable from and towards the valve seat. Movement of the shutter is controlled by a shape memory alloy (SMA) actuating member operating antagonistically to an elastic member, the temperature of the fluid being lower than the transition temperature of the shape memory alloy. The actuating member and the elastic member are connected to the body valve at opposite sides relative to the valve seat. A power control circuit is also provided for circulating an electric current through the actuating member so as to heat the same by Joule effect from a temperature lower than the transition temperature to one that is higher. At least one vent hole is formed in the valve body for putting a portion of the chamber upstream of the valve seat into fluid communication with the outside or a collection network. The actuating member is housed in that portion of chamber corresponding to the inlet port of the fluid, whereby a continuous flow of fluid around the actuating member is ensured for accelerating the cooling process. A closed-loop control circuit for the power control circuit controls the circulating current as a function of a pressure signal generated by fluid pressure sensing means and in such a way as to offset the retarding effect produced by the fluid during heating of the actuating member.

9 Claims, 5 Drawing Sheets

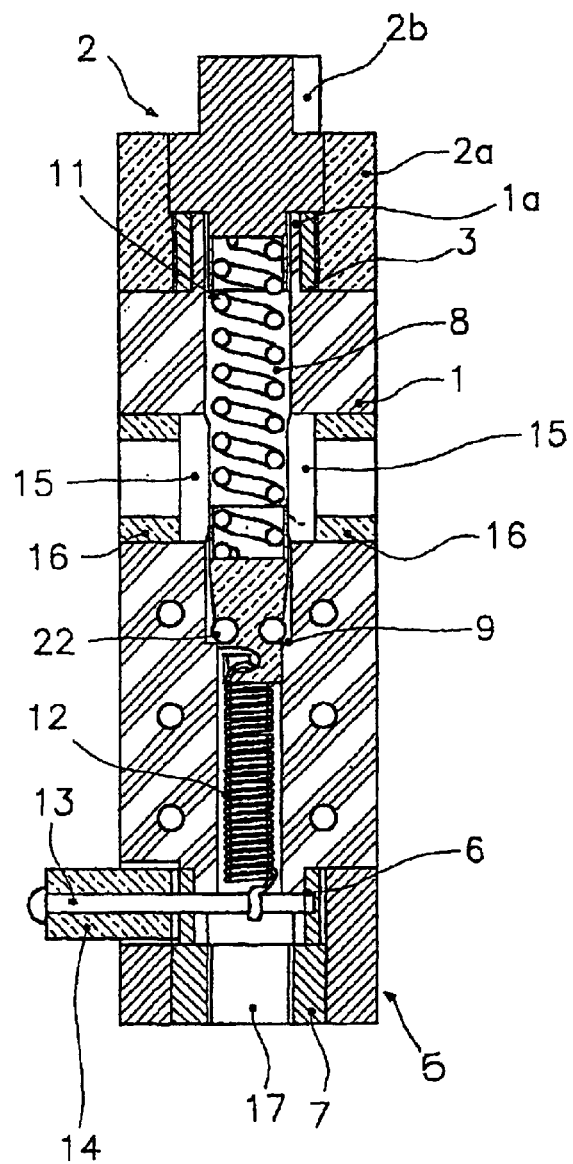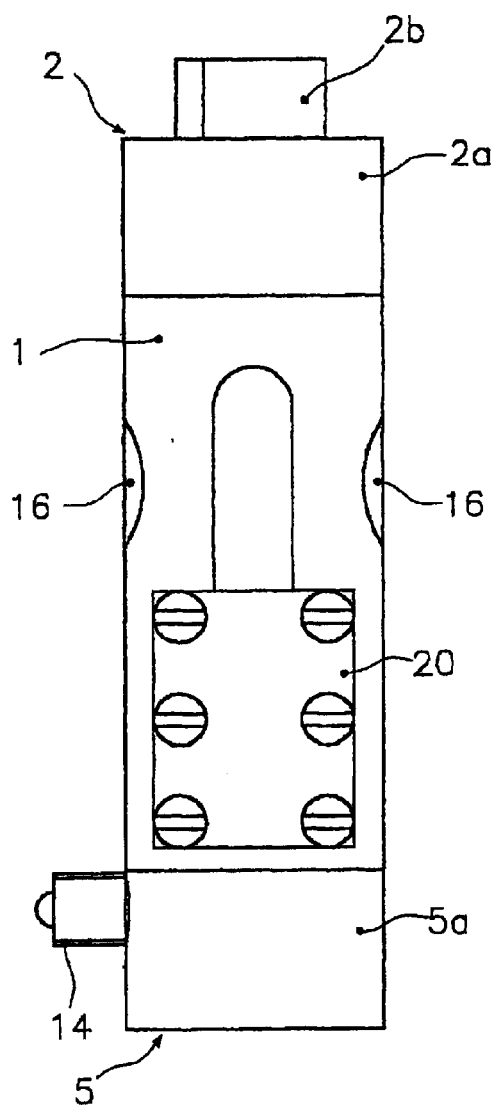
Fig.4
Fig.5

PROPORTIONAL VALVE WITH SHAPE MEMORY ALLOY ACTUATOR

FIELD OF THE INVENTION

The present invention relates generally to fluid control devices and, more particularly, to valves for precision pneumatic driving units and controlled pressure gas delivery systems.

BACKGROUND OF THE INVENTION

Conventional valves, such as those for precision pneumatic driving units and controlled pressure gas delivery systems, often utilize an actuating member made of a shape memory alloy (or SMA), e.g., nickel-titanium alloys. These alloys typically undergo a thermoelastic phase transition during passage from the martensitic to the austenitic phase, and vice versa, such transition being induced by a selected variation in temperature. Below the transition temperature (or martensitic phase), the alloy typically undergoes plastic deformation. The alloy remains in this condition until it is heated to a temperature above the transition temperature (or austenitic phase), at which time it reversibly recovers its original shape. In a typical valve configuration, a shape memory alloy member acts on a valve shutter against the bias of an elastic member, preferably made of steel. Such action on the shutter usually prevails when the temperature of the alloy member is lower than the transition temperature, whereas when its temperature becomes higher than the phase transition temperature, the shutter is overcome by the bias of the alloy member.

This configuration was used mainly to design on-off type valves: see for example U.S. Pat. Nos. 4,570,851, 5,261,597, 5,984,195, wherein the temperature of the shape memory alloy member is directly controlled by the flowing fluid which thus controls the opening and closure of the valve. In U.S. Pat. Nos. 4,736,587 and 4,973,024 the temperature of the shape memory alloy member is controlled by Joule effect by circulation of an electric current through it. In these examples the shape memory alloy member is in the shape of a wire or a coil spring.

Proportionally operating valves with an actuator made of a shape memory alloy heated by Joule effect have also been made. U.S. Pat. No. 5,865,419 discloses a valve shutter which is pulled towards the valve seat by a shape memory alloy wire against the bias of a steel spring. The passage of a controlled electric current through the shape memory alloy wire controls the force exerted on the shutter and therefore the flow section of the valve. The control unit includes a PWM controller to vary the duty cycle of the electric current to be supplied to the wire, thus controlling the amount of heat produced by Joule effect in the wire and therefore the variation of the valve opening following to a variation of the linear deformation of the wire.

U.S. Pat. No. 5,211,371 discloses a valve wherein the shutter actuator is constituted by a shape memory alloy wire arranged coaxially to a counteracting steel coil spring. The valve opening varies with the variation of the current circulating through the wire and provision is made for a control circuit based on the application of an electric drive to the SMA member to circulate a current through it capable to heat it and to operate the actuator. The drive is performed by means of a variable frequency pulse generator as a function of a control voltage applying pulses of the same duration with variable frequency. By increasing the frequency of the pulses the power applied to the SMA member, and then the amount of heating, is increased and vice versa. The control circuit can be associated to a closed loop feedback system.

A similar valve configuration with shape memory alloy actuator and relevant electric power control circuit is disclosed in GB 2251963. The control circuit uses a PID controller and is based, inter alia, on the variation of the resistivity of the SMA member as a function of the phase transitions of the constituent material.

While useful, valves with shape memory alloy actuators are limited in the attainable degree of controlled precision in response time that can be achieved. Response time must, of course, be as short as possible, especially when the SMA member is returned to the austenitic phase.

OBJECTS AND SUMMARY OF THE INVENTION

Accordingly, it is an object of the present invention to provide a proportional valve having a shape alloy memory actuator, specifically for use in mini- and microsystems, that is capable of controlling high pressures with a high degree of precision of outlet pressure control, while having limited size and very low weight.

Another object of the present invention is to provide a proportional valve that can be readily integrated in a compact pneumatic control unit for use in industrial and biomedical applications that require small dimension, high performance pneumatic control systems.

These objects are attained by a proportional valve with shape memory alloy actuator, according to the preamble of claim 1, and characterized in that at least one vent hole is formed on its body for enabling communication between a portion of the inner valve chamber upstream of the valve seat and the outside or a collection network, the actuator member being placed within the portion of the chamber that is corresponds to the fluid inlet. In this manner, a continuous fluid flow is ensured around the shape memory allow member, thereby accelerating the cooling process when passage of current through the actuator member is interrupted. It also provides a closed loop control circuit to power and control the current circulating through the actuator member as a function of a pressure signal generated by an outlet fluid pressure sensor and in such a way as to offset the retarding effect of the fluid flow during heating of the actuator member.

In one preferred embodiment of the present invention, the retarding effect of the fluid flow during heating of the actuator member is offset by a controlled oversupply of electric current flowing through the shape memory alloy member. This oversupply is applied for a selected time, such time being variable according to the initial and final position of the shutter (from about 1 ms to about 100 ms). In this manner, the temperature of the member is brought to a predetermined value so as to allow the member to exert an initial force suitable for offsetting the retarding effect of the fluid flow.

According to another embodiment of the invention, there is provided a method for controlling a valve having a shape memory alloy actuator member, as set forth above, and further comprising the steps of continuous circulation of the fluid to be controlled upstream of the valve seat, so as to reduce the slope of the operating curve and improve the controllability by retarding the valve opening, and accelerating the closure thereof, whereby operation of the system is linearized.

BRIEF DESCRIPTION OF THE DRAWINGS

Other features and advantages of the present invention will become apparent from the following description of a specific, illustrative embodiment of the invention, set forth below, and made with reference to the attached drawings, in which:

FIG. 4 is a sectional view of the valve shown in FIG. 3 taken along lines IV—IV;

FIG. 5 is a plan view of the valve shown in FIG. 4;

The same numerals are used throughout the drawing figures to designate similar elements. Still other objects and advantages of the present invention will become apparent from the following description of the preferred embodiments.

DETAILED DESCRIPTION OF THE PREFERRED EMBODIMENTS

Figure 1:
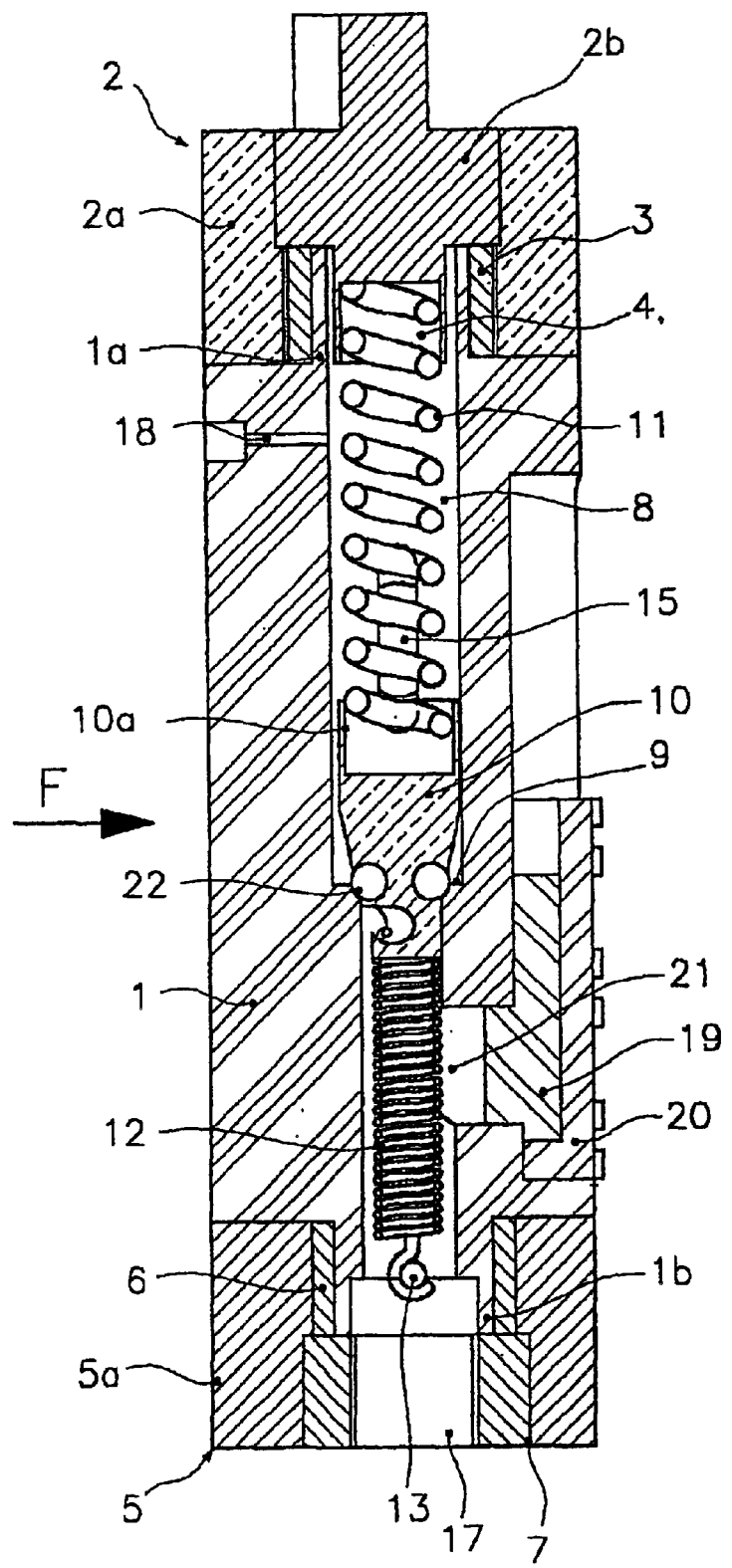
FIG. 1 shows a longitudinal section of a proportional valve with shape memory alloy actuator, according to one aspect of the present invention.
Figures 2, 3:
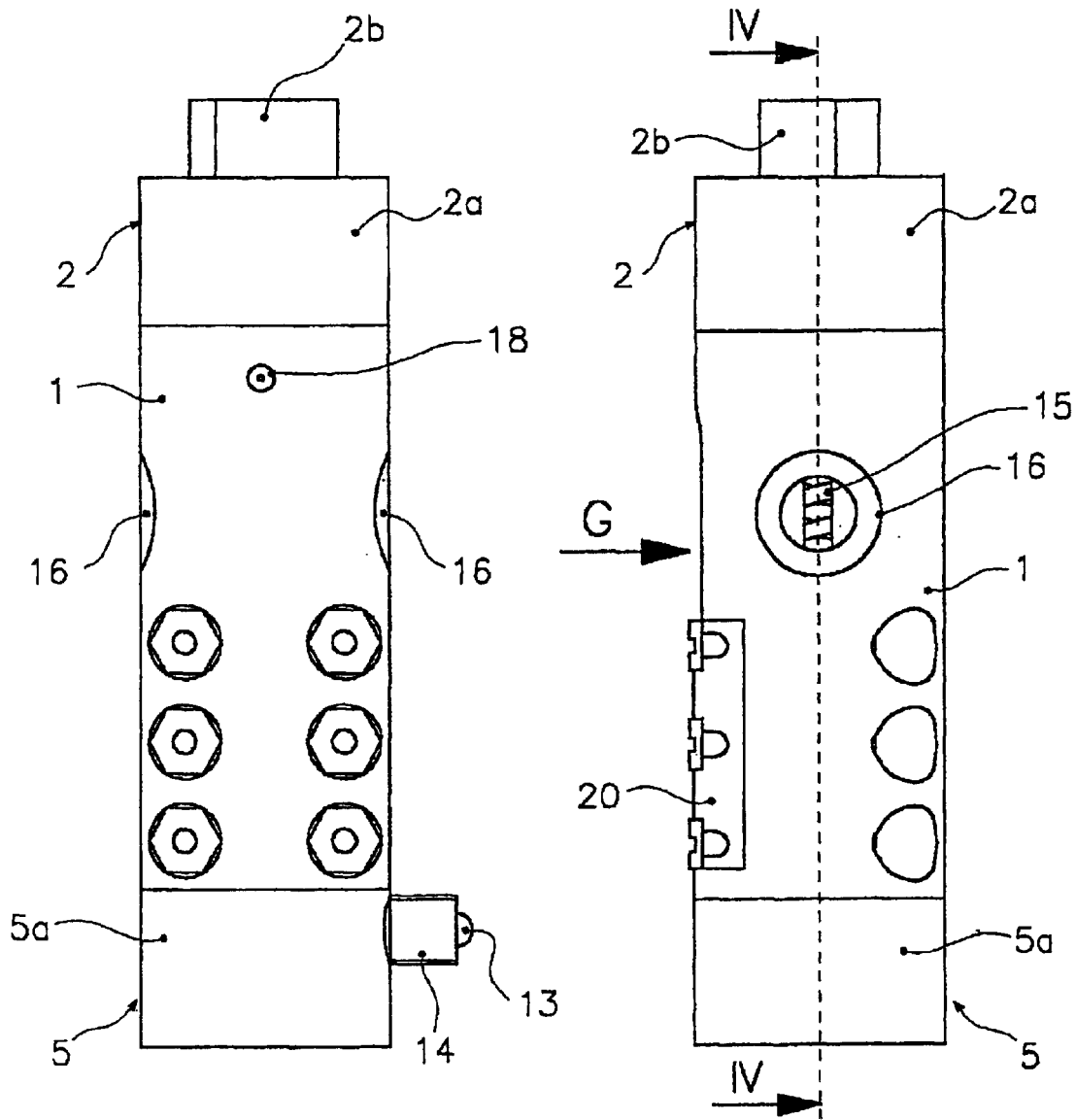
FIG. 2 is a plan view of the valve of FIG. 1.
FIG. 3 is a plan view of the valve of FIG. 1 rotated 90° relative to the valve shown in FIG. 2.

Referring now to the drawings and, more particularly, to FIGS. 1-9, there is shown generally a specific, illustrative proportional valve with shape memory alloy (or SMA) actuator, according to the present invention. According to one aspect of the present invention, the valve comprises a tubular body 1, preferably made of a selected polymeric material such as plastic. Body 1 is desirably closed at one end, which will be referred to hereinafter as the upper end, by an upper plug 2 formed by a tubular part 2a screwed to a ring nut 3. The ring nut is, in turn, affixed to an axial tubular expansion 1a of body 1, and by a part 2b is affixed to an inner side portion of tubular part 2a, and ending with a hollow appendage 4 that engages tubular expansion 1a within body 1. The other end of body 1, referred to hereinafter as the lower end, is preferably closed by a lower plug 5 formed by tubular part 5a which is affixed to an axial expansion 1b of body 1 through a ring nut 6 that is affixed to the expansion. A tubular sleeve member 7 is joined to the inner side of the tubular part 5a.

An axial chamber 8 is formed inside body 1 and is closed at its upper end from part 2b of upper plug 2. A valve seat 9 is formed at an intermediate point of chamber 8; a conical shutter 10 made of electrically conductive material is slidably engaged with seat 9. The end of shutter 10 facing toward upper plug 2 is formed with a cavity 10a within which the end of a spring 11 is engaged, preferably of elicoidal shape, made of shape memory alloy (SMA) axially placed in chamber 8 and abutting with the other end on part 2b of the upper plug 2 by engaging within hollow appendage 4. In particular, spring 11 is fixed to shutter 10 by means of a conductive adhesive of any known type.

A tractive spring 12, preferably made of steel, extends axially within chamber 8 between shutter 10 and lower plug 5 of body 1. More precisely, spring 12 is hooked at one end to shutter 10 and at the other end to a transverse pin 13, preferably made of steel, engaged with a support element 14 fixed to tubular part 5a of lower plug 5 and radially extending therefrom.

Two entry ports 15 for a fluid to be controlled, whose temperature is lower than the transition temperature of the shape memory alloy constituting spring 11, are formed in body 1 at diametrically opposite sides and communicating with the part of chamber 8 within which spring 11 is placed. In particular, entry ports 15 have an outlet section in the shape of an axially extending slot an a circular inlet section, obtained by respective connection sleeves 16 for connecting the valve with the fluid source or the distribution network. The elongated shape of the entry ports ensures that the fluid flow, leaving chamber 8 through a vent hole 18, be constant and independent from the position of shutter 9. Furthermore, the slot-like shape has a low fluid resistance, thus resulting in a reduction of the inlet pressure drops. The outlet conduit of the controlled fluid, indicated at 17, is formed in sleeve 7 coaxially to chamber 8.

A vent hole 18 puts into communication the portion of chamber 8 in which spring 11 is housed with the outside or a fluid collection network. The presence of vent hole 18 ensures the fluid circulation around spring 11 which assist in the continuous cooling thereof. In order to involve the utmost surface of spring 11 to the fluid circulation, vent hole 18 is formed at one end of body 1, in particular near to upper plug 2.

A pressure sensor 19, locked by a cover 20, is housed in a side seat 21 of body 1 which communicates with the part of chamber 8 downstream of shutter 10. Pin 13 and the part 2b of upper plug 2 are electrically connected to a power supply to allow the passage of electric current through shape memory alloy spring 11.

The valve is set to be normally closed. In fact, in the absence of an electric current circulating within spring 11, the combined effect of pressurized fluid flow through entry ports 15 and the traction exerted by spring 12, causes spring 11 to plastically elongate and then shutter 10 moves to occlude completely seat 9 of the valve. Sealing is ensured by an O-ring 22 placed around shutter 10.

The circulation of electric current through spring 11 causes its progressive heating due to Joule effect until the phase transition temperature is reached, at which moment spring 11 recovers its initial contracted shape overcoming the reaction of spring 12 and the fluid differential pressure, and making the shutter 10 to slide progressively away from seat 9 of the valve. The conical shape of the shutter improves the proportionality function of the valve, because a gradual increase of the cross sectional area for the controlled fluid corresponds to an axial displacement of the shutter which gives rise to a proportional reduction of the fluid resistance of the valve.

Pressure sensor 19 used with the present embodiment of invention is of the diaphragm type, wherein the pressure of the controlled fluid deforms the diaphragm and, through a pressure transducer, for example, piezoresistors, the deformation is transformed into a voltage difference, which, therefore, is directly correlated to the pressure. Sensor 19 provides a control signal for an electric drive circuit, schematically shown in FIG. 6.

Figure 6:
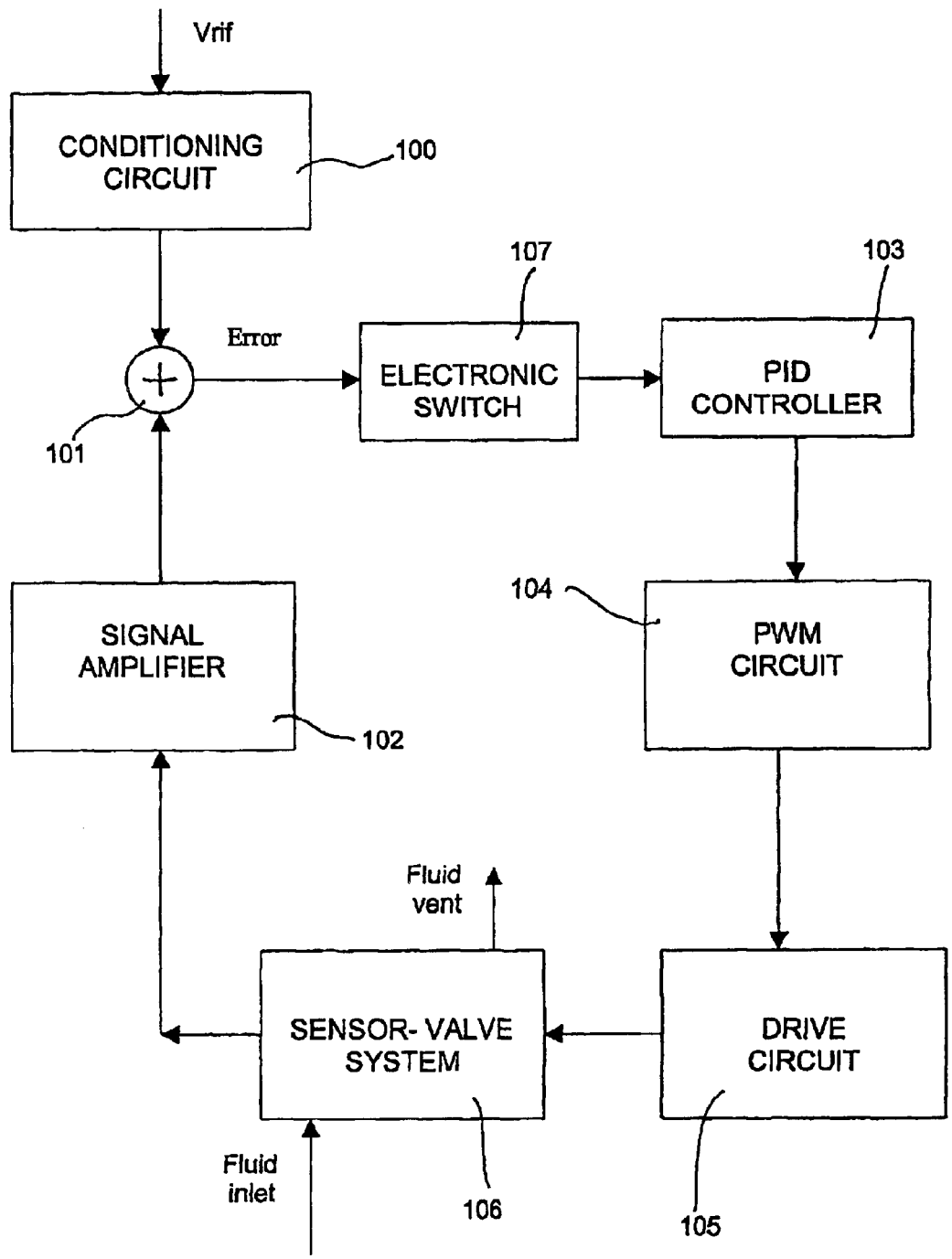
FIG. 6 is a schematic diagram illustrating a power control circuit of a shape memory alloy actuator member, according to one aspect of the present invention.

The diagram of FIG. 6 includes a block 100, in particular to set the pressure value which must be controlled in an environment located downstream of the valve. The signal from the conditioning circuit 100 and the signal from a signal amplifier 102 are supplied to a conventional adder 101. The output of adder 101, through an electronic switch 107, arrives to a PID controller 103 which amplifies the error signal and handles the transfer function of the system. The signal of PID controller 103 reaches a drive circuit comprising, for example, a conventional pulse width modulator (P.W.M.) 104, which drives the power drive circuit 105 acting on block 106 consisting of the valve-sensor system and comprising SMA spring 11, to which an heating current provided by the drive circuit 105 is applied. The pressure sensor 19 provides the signal correlated to the pressure downstream of shutter 10, which is amplified by amplifier 102 and is sent to adder 101, to provide the error signal of the drive and control circuit loop consisting of blocks 101, 103, 104, 105, 106, 102.

Electronic switch 107 placed between adder 101 and controller 103 is used to discriminate the type of control to be applied (on-off or PID control). If an on-off type control is selected, the signal is such that PID controller is saturated or cut off. In other words, the purpose of the electronic switch 107 is to discriminate between small error signals, for which PID control block 103 is fully operative in the linear zone, and large error signals (positive or negative signals).

In the case of large error signals electronic switch 107, which comprises threshold circuits for its actuation (a positive threshold and a negative threshold), sends signals to blocks 103, 104, 105, respectively PID controller, PWM circuit and drive circuit, to actuate the system in the on-off mode. This is shown in the left part of FIGS. 8 and 9 which will be discussed below.

A structure of the electronic switch 107 can be easily understood by a person skilled in the art and is based, for example, on the use of a pair of Schmitt triggers with respective reference thresholds of positive error and negative error. In this way it is possible to approach quickly to the valve operating point in the opening phase.

Figure 7:
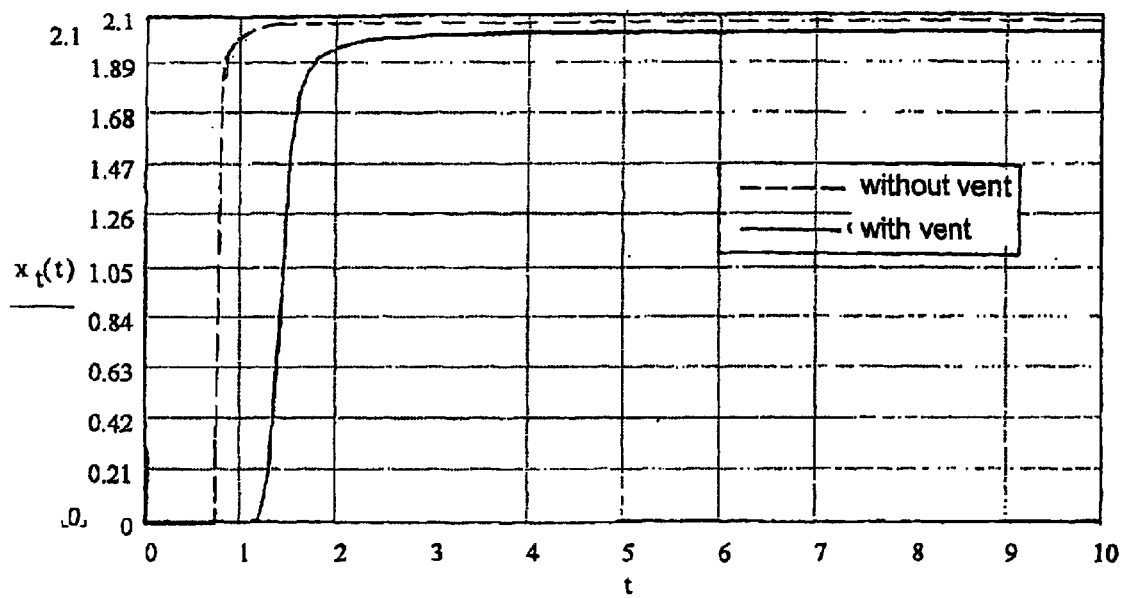
FIG. 7 is a graph illustrating shutter position response vs., with and without a vent, when an electric current flows through a shape memory alloy actuator member.

FIG. 7 graphically shows the effect of the presence of vent hole 18 on the operation of the valve. As can be seen, in the absence of a vent the slope of the curve is too steep to allow an accurate and steady control without oscillations (hunting) to be carried out and the control system can substantially operate in the on-off mode only. On the other hand, in the presence of a vent the more gradual slope of the operating curve allows to effectively operate even in the proportional mode. The cooling action generated by the fluid circulation due to the presence of a vent, which retards the response at the opening of the valve, can be easily offset by increasing the current which is passed through spring 11. The presence of a vent hole, on the other side, increases substantially, in the range of 70%, the cooling power as the spring, through which the passage of current has been interrupted, is contacted by the lower temperature fluid passing through the vent hole, in this way accelerating the cooling and, therefore, the closure of the valve.

Figures 8, 9:
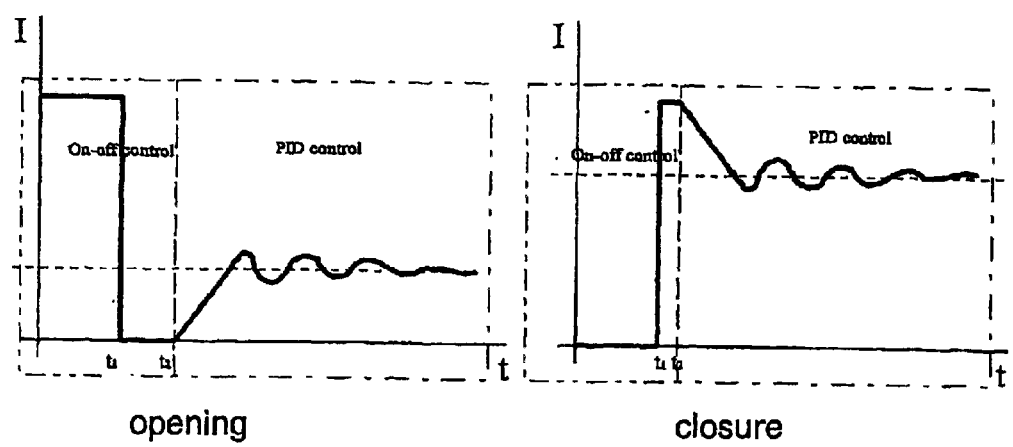
FIG. 8 is a graph illustrating an operating mode with a relatively large initial error in a first direction.
FIG. 9 is a graph illustrating an operating mode with a relatively large initial error in a direction opposite to that shown in FIG. 8.

FIGS. 8 and 9 show the current vs time response at the opening and closure of the valve. As shown in the figures, the first part of the current response is characterized by an operation of the on-off type, during which the control circuit interacts with the system in such a way to bring the valve outlet pressure to the value of the set pressure, with an error equal to, for example, 20 mbar as an absolute value. Afterwards the control circuit adapts itself to the new situation (error lower than 20 mbar as absolute value) by operating as PID with the typical oscillating response around a value corresponding to zero error. The response of the pressure corresponding to the responses of the above mentioned currents is typical of a second order system, with the presence of a very low, possibly equal to zero, overshoot.

Various modifications and alterations to the invention may be appreciated based on a review of this disclosure. These changes and additions are intended to be within the scope and spirit of the invention as defined by the following claims.

What is claimed is:

1. A proportional valve for controlling the outlet pressure of a fluid flowing therethrough, which comprises a valve body having an inlet port and an outlet port for the fluid and an inner chamber, the chamber including a valve seat that is opened and closed variably by a shutter movable axially towards and away from the valve seat, shutter movement being controlled by a shape memory alloy actuating member operating antagonistically to an elastic member, the temperature of the fluid being lower than the transition temperature of the shape memory alloy, the actuating member and the elastic member being connected to the body valve at opposing sides relative to the valve seat, and a power control circuit circulating an electric current through the actuating member so as to heat the same by Joule effect from a temperature generally lower than the transition temperature, wherein the elastic member on the shutter prevails, to a temperature that is generally greater than the transition temperature, wherein the actuating member on the shutter prevails, at least one vent hole is formed in the valve body for putting a portion of the chamber upstream of the valve seat into fluid communication with the outside or a fluid collection network, the actuating member being housed in that portion of chamber corresponding to the inlet port of the fluid, whereby a continuous flow of fluid around the actuating member is ensured for accelerating the cooling process, a closed-loop control power circuit being provided for controlling the circulating current as a function of pressure signal generated by a fluid pressure sensor and in such a way as to offset the retarding effect produced by the fluid during heating of the actuating member.

2. The proportional valve set forth in claim 1, wherein the shape memory alloy actuating member has the shape of a coil spring.

3. The proportional valve set forth in claim 1, wherein the fluid inlet port is formed by at least two diametrically opposed radial openings in the valve body and flowing into the chamber corresponding to the actuating member.

4. The proportional valve set forth in claim 3, wherein the radial openings have an axially extending slot-like shape.

5. The proportional valve set forth in claim 1, wherein the vent hole is formed in the valve body near one end thereof.

6. The proportional valve set forth in claim 1, wherein the shutter has a conical shape.

7. The proportional valve, wherein the control circuit comprises a PID controller.

8. The proportional valve set forth in claim 7, wherein the control circuit comprises a threshold electronic switch for discriminating between operation in PID linear zone or under saturation condition in the positive or negative direction to accelerate the attainment of steady state control conditions.

9. A method for controlling a proportional valve with a shape memory alloy actuating member, wherein a continuous circulation of fluid to be controlled is maintained upstream of a valve seat to reduce the slope of the operating curve and, thereby, improve controllability by retarding the valve opening and accelerating valve closure, thus linearizing system operation.

* * * * *